United States Patent
March Nomen (10) Patent No.: US 11,773,828 B2
(45) Date of Patent: Oct. 3, 2023

(54) WIND TURBINE BLADE HAVING AN ICE FORMATION SYSTEM AND A LIGHTNING PROTECTION SYSTEM

(71) Applicant: Siemens Gamesa Renewable Energy Innovation & Technology S.L., Sarriguren (ES)

(72) Inventor: Victor March Nomen, Les Fonts (ES)

(73) Assignee: SIEMENS GAMESA RENEWABLE ENERGY INNOVATION AND TECHNOLOGY S/L

(*) Notice: Subject to any disclaimer, the term of this patent is extended or adjusted under 35 U.S.C. 154(b) by 0 days.

(21) Appl. No.: 17/586,400

(22) Filed: Jan. 27, 2022

(65) Prior Publication Data

US 2022/0243704 A1    Aug. 4, 2022

(30) Foreign Application Priority Data

Feb. 2, 2021    (EP) .................................... 21382087

(51) Int. Cl.
*F03D 80/30* (2016.01)
*F03D 80/40* (2016.01)

(52) U.S. Cl.
CPC ............ *F03D 80/30* (2016.05); *F03D 80/40* (2016.05); *F05B 2240/307* (2020.08); *F05B 2280/6003* (2013.01)

(58) Field of Classification Search
CPC ......... F03D 80/30; F03D 80/40; B64D 45/02; B64D 15/12; B64D 15/14; B64D 15/00
See application file for complete search history.

(56) References Cited

U.S. PATENT DOCUMENTS 6,612,810 B1 *  9/2003  Olsen .................... F03D 80/40
                                                    415/908
9,797,381 B2 * 10/2017  Iriarte Eleta ........... F03D 80/40
(Continued)

FOREIGN PATENT DOCUMENTS

CN    103161689 A  *  6/2013
CN    108843523 A  * 11/2018
(Continued)

OTHER PUBLICATIONS

English translation of EP2930356A1 (Year: 2015).*
(Continued)

*Primary Examiner* — Igor Kershteyn
*Assistant Examiner* — Wesley Le Fisher
(74) *Attorney, Agent, or Firm* — Schmeiser, Olsen & Watts LLP (57) ABSTRACT

Provided is a blade for a wind turbine including a trailing edge and a leading edge, a lightning protection system with at least one lightning receptor on the blade tip for receiving lightning and at least one lightning down conductor for conducting a lightning current received by the lightning receptor to the blade root, and an ice formation prevention system with a conductive layer arranged along the leading edge, and a first connection terminal on the first end and a second connection terminal on the second end for connecting the layer with a power supply unit, the first connection terminal is connected with the lightning down conductor, wherein the first connection terminal partially contacts the layer and have a rear section connected to the layer and a front section that longitudinally extends towards the blade tip.

14 Claims, 5 Drawing Sheets

(56) References Cited

U.S. PATENT DOCUMENTS

| | | | |
|---|---|---|---|
| 10,202,966 B2* | 2/2019 | Lipka | F03D 80/30 |
| 10,330,087 B2* | 6/2019 | March Nomen | F03D 80/30 |
| 2009/0246025 A1* | 10/2009 | Lewke | F03D 80/30 |
| | | | 416/146 R |
| 2015/0204311 A1* | 7/2015 | Clemens | F03D 80/30 |
| | | | 219/539 |
| 2017/0045037 A1* | 2/2017 | Lipka | F03D 1/0675 |

FOREIGN PATENT DOCUMENTS

| | | | | |
|---|---|---|---|---|
| CN | 110815860 A | 2/2020 | | |
| EP | 2518312 A1 | 10/2012 | | |
| EP | 2857678 A1 | 4/2015 | | |
| EP | 2930356 A1 * | 10/2015 | ........... | F03D 1/0675 |
| WO | 2018095649 A1 | 5/2018 | | |
| WO | WO-2018095649 A1 * | 5/2018 | | |
| WO | WO-2018219511 A1 * | 12/2018 | ........... | F03D 1/0675 |

OTHER PUBLICATIONS

English Translation of CN108843523A (Year: 2018).*
English Translation of CN103161689A (Year: 2013).*
European Search Report dated Jun. 25, 2021 for application No. 21382087.1.

* cited by examiner

WIND TURBINE BLADE HAVING AN ICE FORMATION SYSTEM AND A LIGHTNING PROTECTION SYSTEM

CROSS-REFERENCE TO RELATED APPLICATIONS

This application claims priority to EP Application No. 21382087.1, having a filing date of Feb. 2, 2021, the entire contents of which are hereby incorporated by reference.

FIELD OF TECHNOLOGY

The following relates to a blade for a wind turbine, in particular, to blades comprising an ice formation prevention system and a lightning protection system.

BACKGROUND

Blades for a wind turbine with an ice formation prevention system and a lightning protection system are known in the art. Taking into account that wind turbines and in particular, the blades of these turbines have high probabilities of being struck by a lightning, it is necessary to equip the blade with a lightning protection system for minimizing the effect of the lightning in the blade, in particular in the electrical elements contained in the blade and/or in the wind turbine.

On the other hand, blades including conductive layers integrated into the shell structure of the blade, in particular in the leading edge of the blade, are known for preventing the formation of ice which adversely affects the efficiency of the wind turbine.

The presence of an ice formation prevention systems in a blade could also affect the efficiency of the lightning protection system. Moreover, the conductive layer can attract lightning and thus damage the blade, particularly on the blade tip region comprising approximately last five meters of the blade, and mostly on end of the conductive layer which is closer to the blade tip. Damage of the conductive layer may result in a limited performance or complete failure of the ice formation prevention system. Solutions to reduce damage in the conductive layer due to lightning striking are known in the art, as for example WO2018/095649A1.

WO2018/095649A1 describes a blade for a wind turbine comprising a trailing edge and a leading edge longitudinally extending from the blade tip to the blade root, a lightning protection system with a lightning receptor arranged on the blade tip for receiving lightning and a lightning down conductor for conducting a lightning current received by the lightning receptor to the blade root, and an ice formation prevention system with a conductive layer arranged along the leading edge having a first end oriented to the blade tip and a second end oriented to the blade root, and a first connection terminal placed on the first end of the conductive layer and a second connection terminal placed on the second end of the conductive layer for electrically connecting the conductive layer with a power supply unit and therefore heating the conductive layer for preventing ice formation. The first connection terminal of the conductive layer is electrically connected with the lightning down conductor such that their potential are equalized, minimizing damage of lightning striking. The blade has several lightning receptors arranged on the blade tip region for attracting lightning and protecting the conductive layer of the ice formation prevention system.

SUMMARY

An aspect relates to provide a blade for a wind turbine.

An aspect relates to a blade for a wind turbine comprising a trailing edge and a leading edge longitudinally extending from the blade tip to the blade root, a lightning protection system with at least one lightning receptor arranged on the blade tip for receiving lightning and at least one lightning down conductor for conducting a lightning current received by the lightning receptor to the blade root, and an ice formation prevention system with a conductive layer arranged along the leading edge having a first end oriented to the blade tip and a second end oriented to the blade root, and a first connection terminal placed on the first end of the conductive layer and a second connection terminal placed on the second end of the conductive layer for electrically connecting the conductive layer with a power supply unit, the first connection terminal of the conductive layer is electrically connected with the lightning down conductor, wherein the first connection terminal partially contacts the conductive layer and have a rear section connected to the conductive layer and a front section that longitudinally extends towards the blade tip.

Thus, the first connection terminal of the conductive layer is oversized towards the blade tip to attract lightning and thus preventing them to directly strike onto the conductive layer avoiding damage of the conductive layer. Moreover, the oversized first connection terminal is arranged on the blade tip region and allows to reduce the number of lightning receptors required to be arranged on the blade tip region for attract lightning and protect the conductive layer of the ice formation prevention system. The oversized first connection terminal is cheaper and requires a less complicate manufacturing process than placing lightning receptors on the blade tip region.

BRIEF DESCRIPTION

Some of the embodiments will be described in detail, with reference to the following figures, wherein like designations denote like members, wherein.

DETAILED DESCRIPTION

Figure 1:
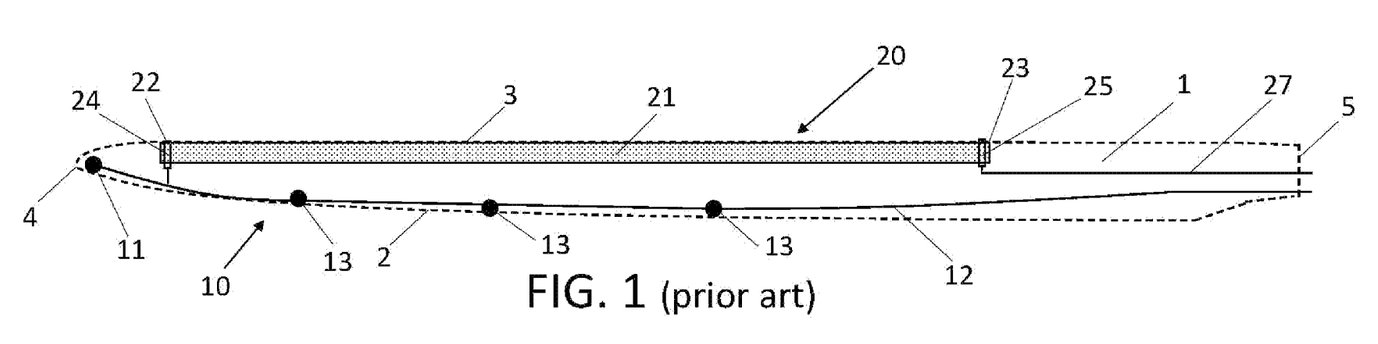
FIG. 1 shows a blade for a wind turbine comprising a lightning protection system and an ice formation prevention system according to the prior art.

FIG. 1 shows a blade 1 for a wind turbine comprising a lightning protection system 10 and an ice formation prevention system 20 according to the prior art. The blade 1 has a trailing edge 2 and a leading edge 3 longitudinally extending from the blade tip 4 to the blade root 5. A dashed line represents the profile of the blade 1.

The lightning protection system 10 comprises a lightning receptor 11 arranged on the blade tip 4 for receiving lightning and a lightning down conductor 12 for conducting a lightning current received by the lightning receptor 11 to the blade root 5. The lightning current is conducted from the the blade root 5 to a ground terminal through the hub (not represented).

The ice formation prevention system 20 comprises a conductive layer 21 which is arranged along the leading edge 3 and which have a first end 22 oriented to the blade tip 4 and a second end 23 oriented to the blade root 5. The ice formation prevention system 20 further comprises a first connection terminal 24 placed on the first end 22 of the conductive layer 21 and a second connection terminal 25 placed on the second end 23 of the conductive layer 21 for electrically connecting the conductive layer 21 with a power supply unit (not shown in FIG. 1) and for heating the conductive layer 21.

The conductive layer 21 is a heating mat comprising a conductive material (for example carbon fibers) for deicing the ice formed onto the blade 1. Said conductive layer 21 attracts lightning that may damage the blade 1, so the first connection terminal 24 of the conductive layer 21 is electrically connected with the lightning down conductor 12, ensuring the equipotentiality of the ice formation prevention system 20 and the lightning protection system 10. The blade 1 also comprises other lightning receptors 13 arranged on the trailing edge 2 of the blade 1 to prevent lightning to strike the conductive layer 21. However, most of the lightning strike occur at the first end 22 of the conductive layer 21 which is closer to the blade tip 4, due to electric field intensification at that point, and the lightning receptor 11 of the blade tip 4 and the other lightning receptors 13 of the trailing edge 2 do not proper prevent lightning occur in said point. In order to protect the conductive layer 21 several lightning receptors need to be placed on the blade tip region increasing the cost of the blade and a complex manufacturing process.

Figure 2:
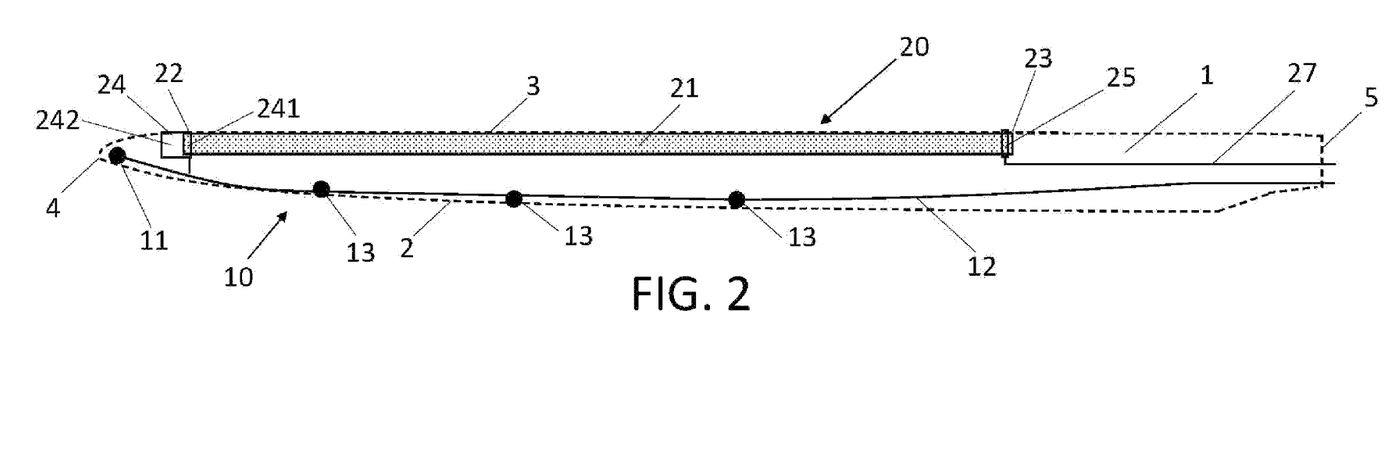
FIG. 2 shows a blade for a wind turbine comprising a lightning protection system and an ice formation prevention system according to the invention.

FIG. 2 shows a blade 1 for a wind turbine according to embodiments of the invention. The blade 1 is identical to the blade 1 described above in FIG. 1 but has a first connection terminal 24 which is oversized towards the blade tip 4 to attract lightning and thus preventing them to directly strike onto the first end 22 of the conductive layer 21.

Figure 3:
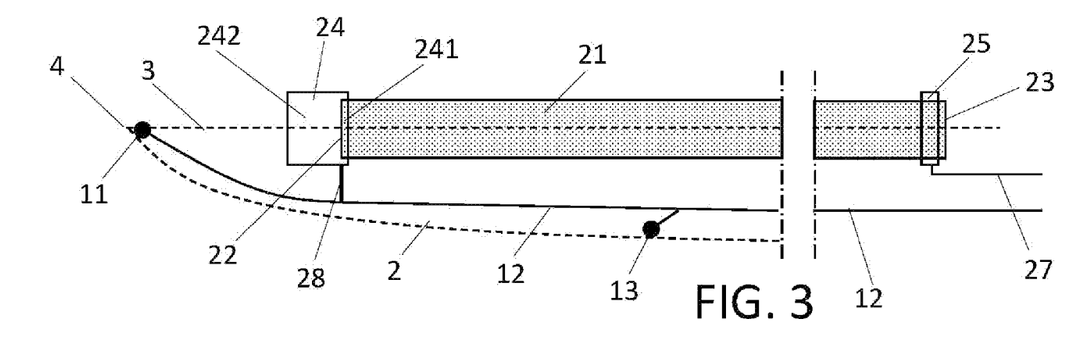
FIG. 3 shows an enlarged view of the blade tip region of the blade of FIG. 2.

As shown in detail in FIG. 3, the first connection terminal 24 partially contacts the conductive layer 21 and have a rear section 241 connected to the conductive layer 21 and a front section 242 that longitudinally extends towards the blade tip 4. The front section 242 creates a conductive mass close to the blade tip 4 where lightning may directly strike, thus preventing them to strike onto the first end 22 of the conductive layer 21. As stated above, the first connection terminal 24 is electrically connected with the lightning down conductor 12, thus the first connection terminal 24 works as a lightning receptor. The first connection terminal 24 is electrically connected with the lightning down conductor 12 through a conductor 28.

Figure 4:
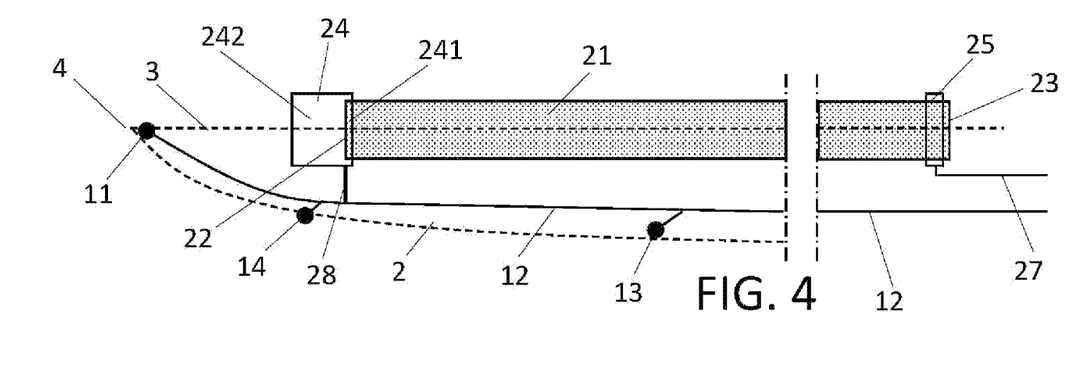
FIG. 4 shows an enlarged view of another embodiment of the blade.

FIG. 4 shows another embodiment of the blade shown in FIGS. 2 and 3. The blade 1 further comprises another lightning receptor 14 arranged parallel to the first connection terminal 24 on the trailing edge 2 of the blade 1. As explained above, the first connection terminal 24 works as a lightning receptor on the leading edge 3 preventing lightning striking onto the conductive layer 21, but lightning may strike on the trailing edge 2, on the part opposed where the first end 22 of conductive layer 21 is placed, thus the another lightning receptor 14 is placed on said zone of the trailing edge 2.

Figure 5:
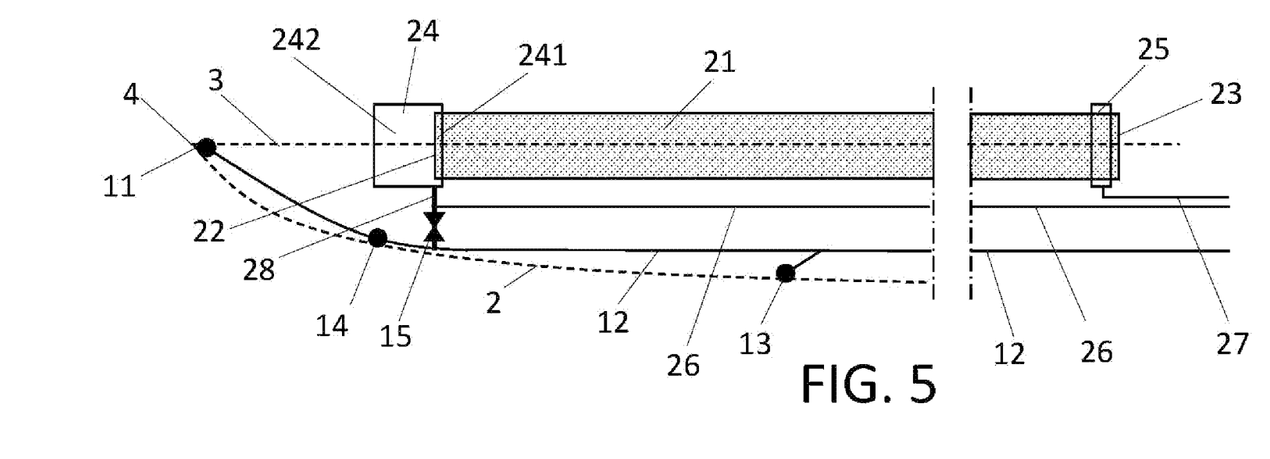
FIG. 5 shows an enlarged view of another embodiment of the blade.
Figure 6:
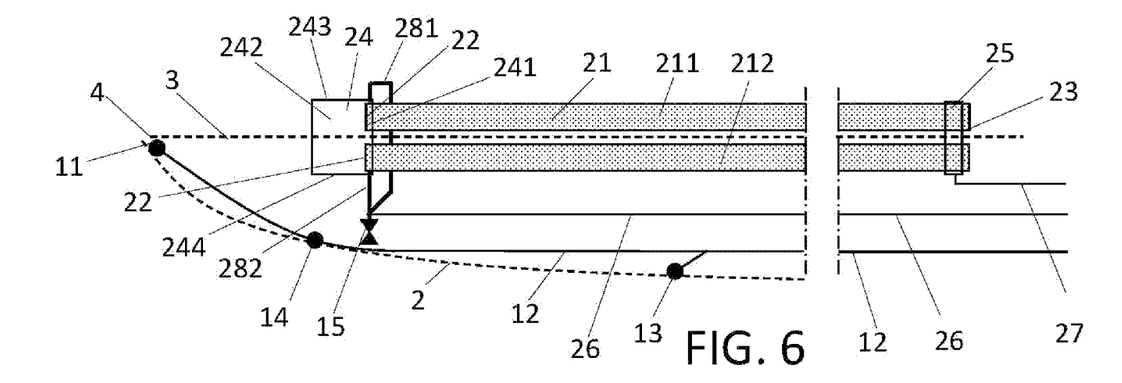
FIG. 6 shows an enlarged view of another embodiment of the blade.
Figure 7:
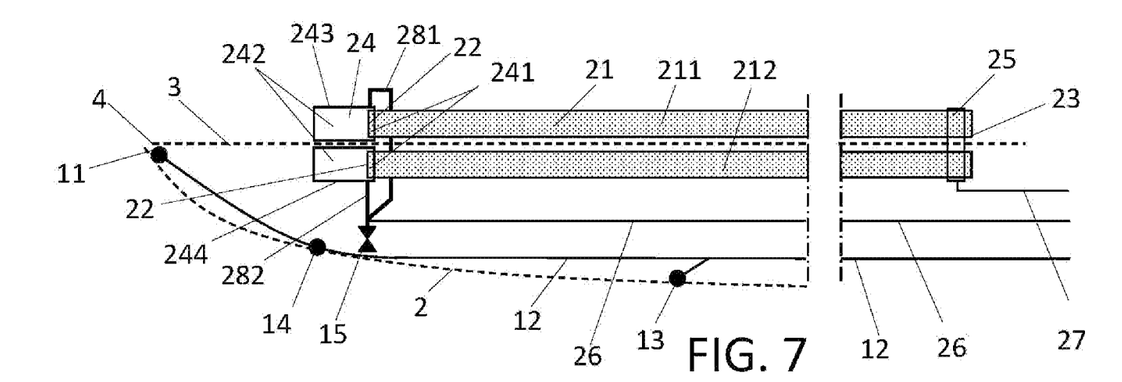
FIG. 7 shows an enlarged view of another embodiment of the blade.

FIGS. 5 to 7 show other embodiments of first connection terminal 24, the conductive layer 21 and the electrical connection with lightning down conductor 12. Said embodiments show that other lightning receptor 14 arranged on the trailing edge 2 of the blade; however said lightning receptor 14 is not necessary for preventing lightning strike onto the conductive layer 21 of the leading edge 3 as describe in FIG. 3.

As shown in the embodiments of FIGS. 3 and 4, the first connection terminal 24 is electrically connected with the lightning down conductor 12 and the second connection terminal 25 is electrically connected with a power supply wire 27, the lightning down conductor 12 and the power supply wire 27 are connected to the power supply unit. In said case, the lightning down conductor 12 works as a power supply wire for heating the conductive layer 21.

Alternatively, as shown in the embodiment of FIG. 5, the first connection terminal 24 is electrically connected with a first power supply wire 26 and the second connection terminal 25 is electrically connected with a second power supply wire 27, the power supply wires 26 and 27 are connected to the power supply unit, and the first power supply wire 26 is connected to the lightning down conductor 12 by a surge protection device 15. In this case, the lightning down conductor 12 does not work as a power supply wire for heating the conductive layer 21, and the conductive layer 21 has independent power supply wires for heating the layer 21. The surge protection device 15 protects the ice formation prevention system 20 when a surge due to a lightning strike occurs, reducing the current passing through the power wires 26 and 27.

The surge protection device 15 works as a switch that closes during the short time of the surge, i.e. it works as an open switch preventing the passage of current when a certain voltage is not exceeded and it works as a closed switch when a certain voltage is exceeded. When the specified voltage is exceeded, the overvoltage currents can flow to the ground via lightning down conductor 12 or via the power supply wires 26 and 27. This circuit only lasts for the duration of the surge, normally some microseconds up to few milliseconds. The surge protection device 15 can be based on a spark gap technology, or varistor technology (MOV) or any other know suitable device used to limit voltage differences between conductors.

Embodiments of FIGS. 6 and 7 are equivalent to FIG. 5 describe above but show a conductive layer 21 comprising a first piece 211 arranged in parallel with a second piece 212, each piece 211 and 212 is arranged at one side of the leading edge 3.

Usually, a blade 1 for a wind turbine is manufactured in two pieces. The blade comprises an upper shell and a lower shell that are built independently in a vacuum infusion process and after that they are assembled to obtain the blade 1. Thus, for simplifying the manufacturing process the first piece 211 is arranged on the upper shell of the blade 1 and the second piece 212 is arranged on the lower shell of the blade 1.

Embodiments of FIGS. 6 and 7 further show a first connection terminal 24 comprising a first part 243 arranged at one side of the leading edge 3 and partially contacting the first piece 211 of the conductive layer 21, and a second part 244 arranged at the other side of the leading edge 3 and partially contacting the second piece 212 of the conductive layer 21. The first part 243 of the first connection terminal 24 is electrically connected with the lightning down conductor 12 through a first conductor 281 and the second part 244 of the first connection terminal 24 is electrically connected with the lightning down conductor 12 through a second conductor 282. Each part 243 and 244 have the rear section 241 connected to the conductive layer 21 and the front section 242 that longitudinally extends towards the blade tip 4.

The first conductor 281 and the second conductor 282 are electrically connected with the first power supply wire 26, and the lightning down conductor 12 is electrically connected with the first power supply wire 26 through the surge protection device 15. The first conductor 281 and the second conductor 282 may be an extension of the power supply wire 26.

Having a conductive layer 21 with two pieces 211 and 212 may vary the lightning striking onto the connection terminal 24, and thus the first conductor 281 and second conductor 282 allows a balanced current injection on the lightning down conductor 12 avoiding electrical arcs.

Embodiment of FIG. 6 shows a first connection terminal 24 which is a single piece terminal having the first part 243 and the second part 244 while embodiment of FIG. 7 shows a first connection terminal 24 which is a two pieces terminal having the first part 243 and the second part 244. This latter solution simplifies the manufacturing of a blade 1 manufactured in two parts, commonly the upper shell and the lower shell.

The conductive layer 21 is a heating mat comprising biaxial carbon fabrics and is integrated into the shell of the blade 1 or is placed onto the shell (at both sides of the upper and lower shell separated by the leading edge 3). For example, the conductive layer 21 is a composite sheet having carbon biaxial fibers with a density of 100-600 g/m2. The conductive layer 21 may be obtained during manufacturing of the shell and thus being part of the shell, or can be placed onto the surface of the shell after the shell is obtained.

As represented in the figures the conductive layer 21 is a single heating mat extending along the leading edge 3 of the blade 1 from the blade tip 4 to the blade root 5, and for example occupies approximately ⅔ parts of the leading edge 3. Alternative the conductive layer 21 has two or more heating mats extending along the leading edge 3 of the blade 1; in said case, each heating mat has connection terminals at their ends for receiving power supply, but only the first connection terminal 24 of the first heating mat arranged on the blade tip region is required to be oversized according to embodiments of the invention.

As illustrated in the figures the terminals 24 and 25 are placed at the ends 22 and 23 of the conductive layer 21, however they may be placed close to the ends 22 and 23. For example, while according to embodiments of the invention the first terminal 24 is required to be arranged on the first end 22 as close as possible to the blade tip 4, the second terminal 25 is not required to be placed exactly on the second end 23, and may be placed close to said second end 23.

As illustrated in the figures, the connection terminals 24 and 25 have a shape similar to the shape of the conductive layer 21. The connection terminals 24 and 25 and the conductive layer 21 have a rectangular shape. The connection terminals 24 and 25 are flat connection terminals. The connection terminals 24 and 25 are flat metallic sheets.

Power supply wires 26 and 27 are standard low voltage wires used to transfer a power supply from the blade root 5 to the connection terminals 24 and 25. Instead or wires other flat or mesh metallic conductors may be used. The connector 28 and the first conductor 281 and the second conductor 282 are standard low voltage wires.

Figures show a single lightning down conductor 12, however, multiple lightning down conductors may be used, in said case, each lightning down conductor is electrically connected to the conductive layer 21 as describe above.

The power supply wires 26 and 27 and lightning down conductor 12 are arranged inside the shell of the blade 1. The wires 26 and 27 and the conductor 12 are arranged onto the inner surface of the shell, or are arranged inside the shell, for example onto a shear web. On the other hand, the terminals 24 and 25 of the conductive layer 21 are placed within the shell or placed onto the outer surface of the shell, thus a conductive element 29 is arranged on the rear section 241 of the first connection terminal 24 to transmit electrical currents from the terminal 24 to the lightning down conductor 12 or to the first power supply wire 26 and the lightning down conductor 12. The second connection terminal 25 has also another conductive element 29 to transmit electrical currents from terminal 25 to the second power supply wire 27 (see FIG. 8). Said conductive elements are made of copper, brass or aluminum.

The skill person will note that the longer the front section 242 of the first connection terminal 24, the closer from the blade tip 4 will be, and the better it will attract lightning, however in order to reduce cost, the applicant experimentally has verified that the first connection terminal 24 proper attract lightning when specific measures of the first connection terminal 24 are used. See FIG. 8.

Figure 8:
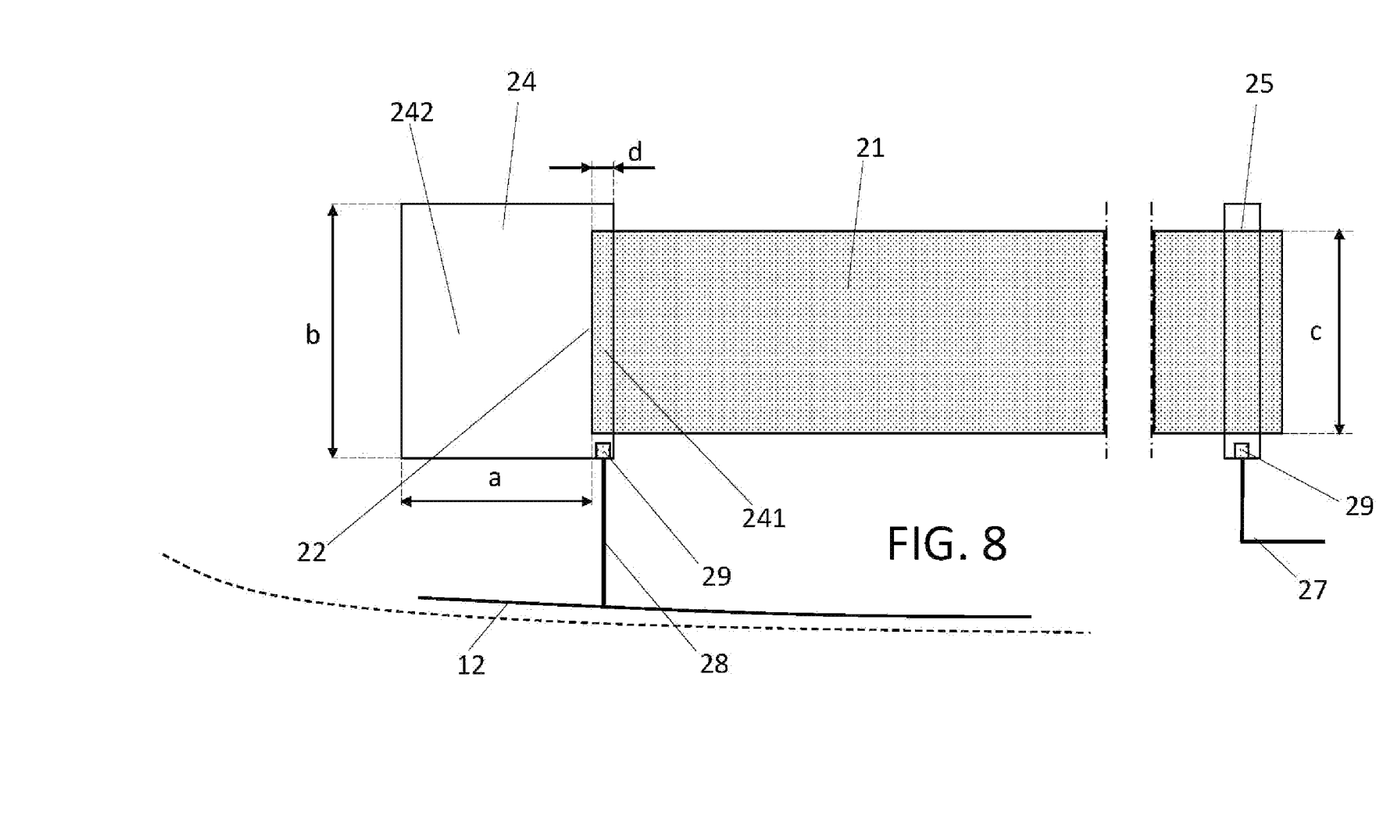
FIG. 8 shows a schematic view of the first connection terminal partially contacting the conductive layer and illustrating comparative measures between both elements.

The front section 242 of the first connection terminal 24 longitudinally extends from the first end 22 of the conductive layer 21 a length "a" between 200-1.500 mm. This length allows the lightning to strike onto the connection terminal 24 far from first end 22 of the conductive layer 21. The rear section 241 of the first connection terminal 24 connecting the conductive layer 21 with the first connection terminal 24 has a length "d" of at least 30 mm. This minimum length "d" where layer 21 overlaps terminal 24 guarantees a proper electrical transmission between the first connection terminal 24 and the conductive layer 21.

The first connection terminal 24 has a width "b" equal or greater than the width "c" of the conductive layer 21. Having a width "b" of the first connection terminal 24 greater than the width "c" of the conductive layer 21 allows the first connection terminal 24 to transversely project from the conductive layer 21, thus the conductive element 29 is placed on the rear section 241 of the first connection terminal 24 for electrically connecting the first end 22 of conductive layer 21 with the lightning down conductor 12 or the first power supply wire 26, through the conductor 28. The relationship b/c>1 also allows a better performance of connection terminal 24 to attach lightning strikes.

It is not desirable to have a width "b" of the first connection terminal 24 smaller than the width "c" of the conductive layer 21 because current injections problems may occur between the terminal 24 and the conductive layer 21. In any case, the width "b" of the first connection terminal 24 can be reduced by enlarging the length "a" of the front section 242 of the first connection terminal 24.

The length "a" and "d" of the first connection terminal 24 is parallel to the longitudinal axis of the blade 1 which longitudinally extends from the blade tip 4 to the blade root 5. The length "a" extends towards the blade tip 4 from the first end 22 of the conductive layer 21 to the front end of the connection terminal 24. The length "d" extends towards the blade root 5 from the first end 22 of the conductive layer 21 to the rear end of the connection terminal 24, thus the conductive layer 21 overlaps the rear section 241 of the first connection terminal 24.

The width "b" of the first connection terminal 24 and width "c" of the conductive layer 21 are transversal to the longitudinal axis of the blade 1.

The connection terminal 24 have a thickness between 100 μm to 1000 μm.

According to a preferred embodiment, the first connection terminal 24 is a rectangular metallic sheet with a length "a" of 500 mm, a width "b" of 700 mm, a length "d" of 50 mm, and a thickness of 0.15 mm. The conductive layer 21 is a rectangular heating mat of a width "c" of 600 mm and a thickness of 0.3 mm.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A blade for a wind turbine comprising:
a trailing edge;
a leading edge longitudinally extending from a blade tip to a blade root;
a lightning protection system with at least one lightning receptor arranged on the blade tip for receiving lightning and at least one lightning down conductor for conducting a lightning current received by the lightning receptor to the blade root; and
an ice formation prevention system with a conductive layer arranged along the leading edge having a first end oriented to the blade tip and a second end oriented to the blade root, and a first connection terminal placed on the first end of the conductive layer and a second connection terminal placed on the second end of the conductive layer for electrically connecting the conductive layer with a power supply unit, the first connection terminal of the conductive layer is electrically connected with the lightning down conductor;
wherein the first connection terminal partially contacts the conductive layer and has a rear section connected to the conductive layer and a front section that longitudinally extends towards the blade tip beyond the conductive layer, the first connection terminal having a width greater than the conductive layer.

2. The blade according to claim 1, wherein the front section of the first connection terminal longitudinally extends from the first end of the conductive layer a length between 200-1500 mm.

3. The blade according to claim 2, wherein the rear section of the first connection terminal connecting the conductive layer with the first connection terminal has a length of at least 30 mm.

4. The blade according to claim 1, further comprising another lightning receptor arranged parallel to the first connection terminal on the trailing edge of the blade.

5. The blade according to claim 1, wherein the first connection terminal is electrically connected with the lightning down conductor and the second connection terminal is electrically connected with a power supply wire, the lightning down conductor and the power supply wire are connected to the power supply unit.

6. The blade according to claim 1, wherein the first connection terminal is electrically connected with a first power supply wire and the second connection terminal is electrically connected with a second power supply wire, the power supply wires are connected to the power supply unit, and the first power supply wire is connected to the lightning down conductor by a surge protection device.

7. The blade according to claim 1, wherein the conductive layer comprises a first piece arranged in parallel with a second piece, each piece is arranged at one side of the leading edge.

8. The blade according to claim 7, wherein the first connection terminal comprises a first part arranged at one side of the leading edge and partially contacting the first piece, and a second part arranged at the other side of the leading edge and partially contacting the second piece, the first part is electrically connected with the lightning down conductor through a first conductor and the second part is electrically connected with the lightning down conductor through a second conductor.

9. The blade according to claim 8, wherein the first conductor and the second conductor are electrically connected with a first power supply wire and the lightning down conductor is electrically connected with the first power supply wire through a surge protection device.

10. The blade according to claim 8, wherein the first connection terminal is a single piece terminal having the first part and the second part.

11. The blade according to claim 8, wherein the first connection terminal is a two pieces terminal having the first part and the second part.

12. The blade according to claim 1, further comprising a conductive element which is arranged on the rear section of the first connection terminal to transmit electrical currents from the first connection terminal to the lightning down conductor.

13. The blade according to claim 1, wherein the first connection terminal is a conductive mass positioned close to the blade tip.

14. The blade according to claim 1, wherein the first connection terminal is physically separate from the blade tip.

* * * * *